United States Patent [19]

Horn, Jr.

[11] 4,385,145

[45] May 24, 1983

[54] PHOSPHITE STABILIZERS FOR POLYESTER RESINS

[75] Inventor: William E. Horn, Jr., Vincent, Ohio

[73] Assignee: Borg-Warner Chemicals, Inc., Parkersburg, W. Va.

[21] Appl. No.: 322,506

[22] Filed: Nov. 18, 1981

[51] Int. Cl.$^3$ ................................................ C08K 5/52
[52] U.S. Cl. ................................................ 524/120
[58] Field of Search ........................................ 524/120

[56] References Cited

U.S. PATENT DOCUMENTS

| | | | |
|---|---|---|---|
| 3,039,993 | 6/1962 | Friedman | 524/120 |
| 3,928,505 | 12/1975 | Klicker et al. | 524/120 |
| 3,940,367 | 2/1976 | Pelousek et al. | 524/120 |
| 4,064,100 | 12/1977 | Hechenbleikner | 524/120 |
| 4,066,611 | 1/1978 | Axelrod | 524/120 |
| 4,097,431 | 6/1978 | Asahara et al. | 524/120 |
| 4,258,153 | 3/1981 | Yomamoto et al. | 524/120 |

FOREIGN PATENT DOCUMENTS 1180398 2/1970 United Kingdom .
1526603 9/1978 United Kingdom .

*Primary Examiner*—John Kight, III
*Assistant Examiner*—R. A. White
*Attorney, Agent, or Firm*—Joseph Shekleton

[57] ABSTRACT

Poly(alkylene terephthalate) compositions containing a stabilizing proportion of a pentaerythritol diphosphite ester. The compositions are relatively stable under usual processing conditions which include high temperatures. Color formation, molecular degradation and acetaldehyde contamination are inhibited significantly.

3 Claims, No Drawings

PHOSPHITE STABILIZERS FOR POLYESTER RESINS

This invention relates as indicated to the stabilization of polyester resins by means of phosphite additives. More particularly it relates to the thermal stabilization of poly(alkylene terephthalate).

BACKGROUND OF THE INVENTION

Poly(alkylene terephthalates) are among the fastest growing plastics in the United States. They have been used for many years as food packaging films and as fibers for clothing, carpeting and tire cord, and more recently as beverage container resins. Most of this latter use has been in the packaging of carbonated beverages, specifically for the family-size non-returnable container.

Poly(ethylene terephthalate) is well suited to such use because it is resistant to shattering and is lightweight.

The processing of poly(ethylene terephthalate) requires the use of relatively high temperatures, viz., in the order of 250°-300° C. Such treatment imposes a severe strain on the polyester molecule which without some form of stabilization, will result in loss of color, loss of viscosity (due to molecular scission and correspondingly decreased molecular weight) and formation of acetaldehyde. All of these are undesirable results and it is necessary to take steps to inhibit such activity to the extent possible.

SUMMARY OF THE INVENTION

The invention is a polymer composition comprising a major proportion of a poly(alkylene terephthalate) wherein the alkylene group contains 2-4 carbon atoms aand a minor proportion sufficient to impart thermal stability to said poly(alkylene terephthalate) of a pentaerythritol diphosphite ester.

U.K. Pat. No. 1,526,603 shows the stabilization of polypropylene by means of a small proportion of bis-(2,4-ditertiarybutylphenyl) pentaerythritol diphosphite. The phosphite is shown to be effective to stabilize the polypropylene against deterioration normally resulting from heat aging, at 150° C., after five extrusions at 475° C. and 525° F.

U.S. Pat. No. 4,066,611 (Axelrod) shows a stabilized aromatic polycarbonate composition containing small proportions of bis-(2,4-ditertiarybutylphenyl) pentaerythritol diphosphite and an epoxy compound. The development of color in such composition upon extrusion at 550° F. and then injection molding at 600° F., 650° F. and 700° F., is less than in an aromatic polycarbonate composition containing another organic phosphite additive.

U.K. Pat. No. 1,180,398 shows ABS, SBR and PVC (polyvinyl chloride) resins which may be stabilized by organic phosphite compounds in combination with primary stabilizers. The organic phosphite compounds each contain an aromatic group and an aliphatic group and are said to possess unusual hydrolytic stability. Included in a list of 43 such organic phosphites, on pages 3 and 4, is 2,4-di-t-butylphenyl pentaerythritol diphosphite.

DESCRIPTION OF THE PREFERRED EMBODIMENTS

The poly(alkylene terephthalate) ester is one wherein the alkylene group contains 2-4 carbon atoms. That is, it may be ethylene, propylene, trimethylene, 1,4-butene, 2-methylpropene, etc. Preferably, the alkylene is ethylene or 1,4-butene because of the ready avabilability of such poly(alkylene terephthalates).

The pentaerythritol diphosphite ester preferably is a bis-(alkylphenyl) or dialkyl pentaerythritol diphosphite. The alkylphenyl groups may include monoalkylphenyl, dialkylphenyl and trialkylphenyl groups although dialkylphenyl groups are preferred. Especially preferred are 2,4-dialkylphenyl groups. The alkyl groups should have 3-6 carbon atoms and tertiarybutyl groups are found most often because of their effect on solubility.

The alkyl groups in the dialkyl pentaerythritol diphosphite each contain 12-20 carbon atoms. They include, for example dodecyl, tetradecyl, hexadecyl, octadecyl (stearyl) and eicosyl groups. Octadecyl (stearyl) is preferred.

The amount of pentaerythritol diphosphite ester which may be used to accomplish the desired thermal stabilization ranges from about 0.05 to about 1.0 percent by weight of the poly(alkylene terephthalate). A particularly preferred range is from about 0.1 to about 0.5 percent on the same basis. More than 1.0 percent can be used without detriment to the polyester but with little or no additional stabilization.

The effectiveness of the pentaerythritol diphosphite esters herein as thermal stabilizers of poly(alkylene terephthalates) is shown by the data in Table I. It is obtained by treating poly(ethylene terephthalate) compositions containing varying amounts of bis-(2,4-ditertiarybutylphenyl) pentaerythritol diphosphite, in a Brabender mixer at 280° C., withdrawing samples at 10-minute intervals and observing the color of these samples. The color ratings of the samples of Composition No. 1 are assigned numerical ratings as shown in the table, 0 being white and 6 being the darkest, the rate of color development being uniform throughout the 60-minute period of the test.

TABLE I

| Composition | Phosphite (%) | (MINUTES) | | | | | | |
|---|---|---|---|---|---|---|---|---|
| | | 0 | 10 | 20 | 30 | 40 | 50 | 60 |
| 1 | 0 | 0 | 1 | 2 | 3 | 4 | 5 | 6 |
| 2 | 0.05 | 0 | 1 | 1 | 2 | 3 | 3 | 4 |
| 3 | 0.10 | 0 | 0 | 1 | 1 | 2 | 3 | 3 |
| 4 | 0.20 | 0 | 0 | 0 | 1 | 2 | 2 | 3 |

It will be seen that the development of color upon heating poly(ethylene terephthalate) is significantly inhibited by increasing amounts of bis-(2,4-ditertiarybutylphenyl) pentaerythritol diphosphite.

So also with molecular degradation, as reflected by a decrease in viscosity. The preparation of poly(alkylene terephthalates) may be accomplished by heating a mixture dimethyl terephthalate and ethylene glycol in the presence of a transesterification catalyst then adding a polymerization catalyst and maintaining the elevated temperature until polymerization is complete. The resulting polymer contains a small proportion of catalyst residues and, while these may be "neutralized" by the addition of a "post-reaction stabilizer", it is believed that they nevertheless contribute to molecular degradation when the polyester is processed at high temperatures.

Such molecular degradation is shown by the data in Table II. It is derived from the tests carried out for the purposes of the data in Table I. The intrinsic viscosities (determined in o-chlorophenol as a solvent) of certain of the samples there were determined. It will be noted that, in each case, although the intrinsic viscosity declined upon heating in a Brabender mixer for 60 minutes at 280° C., the extent of such decline was progressively less as increasing amounts of pentaerythritol polyphosphite ester were used to stabilize the polyester.

TABLE II

| Composition | Phosphite (%) | (MINUTES) 0 | 60 |
|---|---|---|---|
| 1 | 0 | 0.588 | 0.474 |
| 2 | 0.05 | — | 0.484 |
| 3 | 0.10 | — | 0.487 |
| 4 | 0.20 | — | 0.494 |

An important consequence of the molecular degradation of the polyesters herein is the formation of acetaldehyde. Where the polyester is used in the manufacture of bottles fur use in turn as beverage containers it is apparent that significant quantities of acetaldehyde cannot be tolerated. The pentaerythritol diphosphites of this invention are effective to inhibit acetaldehyde formation as shown in Table III. The data there shows the extent of acetaldehyde evolution from Compositions 1 and 4 (of Table I) before (but after heating to 280° C.) and after 60 minutes in a Brabender mixer at 280° C.

TABLE III

| Composition | Phosphite (%) | (MINUTES) 0 | 60 |
|---|---|---|---|
| 1 | — | 1.0 | 1.2 |
| 4 | 0.20 | 0.65 | 0.80 |

The numerical values (above) reflecting the extent of acetaldehyde evolution are based on that amount of such evolution evinced by Composition No. 1 immediately after heating to 280° C., which amount is taken as 1.0.

The efficacy of the pentaerythritol phosphite esters herein as stabilizers for poly(butylene terephthalate) is shown by the data in Table IV. Poly(butylene terephthalate) compositions containing 0.1% of distearyl pentaerythritol diphosphite (A) and bis-(2,4-ditertiarybutylphenyl) pentaerythritol diphosphite (B) are extruded at 245° C. and the intrinsic viscosities of the resulting extrudates determined. A comparison of these viscosities with the viscosities of the same compositions before extrusion allows an appraisal of their resistance to degradation.

TABLE IV

| Composition | Phosphite | Intrinsic Viscosity Before | After |
|---|---|---|---|
| 5 | A | 1,022 | 1,008 |
| 6 | B | 1,022 | 1,005 |
| 7 | none | 1,022 | 0,996 |

All parts and percentages herein unless otherwise expressly stated, are by weight.

I claim:

1. A polymer composition comprising a major proportion of a poly(alkylene terephthalate) wherein the alkylene group contains 2–4 carbon atoms and a minor proportion sufficient to impart thermal stability to said poly(alkylene terephthalate) of a bis-(alkylphenyl)pentaerythritol diphosphite ester.

2. The polymer composition of claim 1 wherein the pentaerythritol diphosphite is a bis-(dialkylphenyl)pentaerythritol diphosphite.

3. The polymer composition of claim 1 wherein the pentaerythritol diphosphite is bis-(2,4-ditertiarybutylphenyl)pentaerythritol diphosphite.

* * * * *